Figure 1:
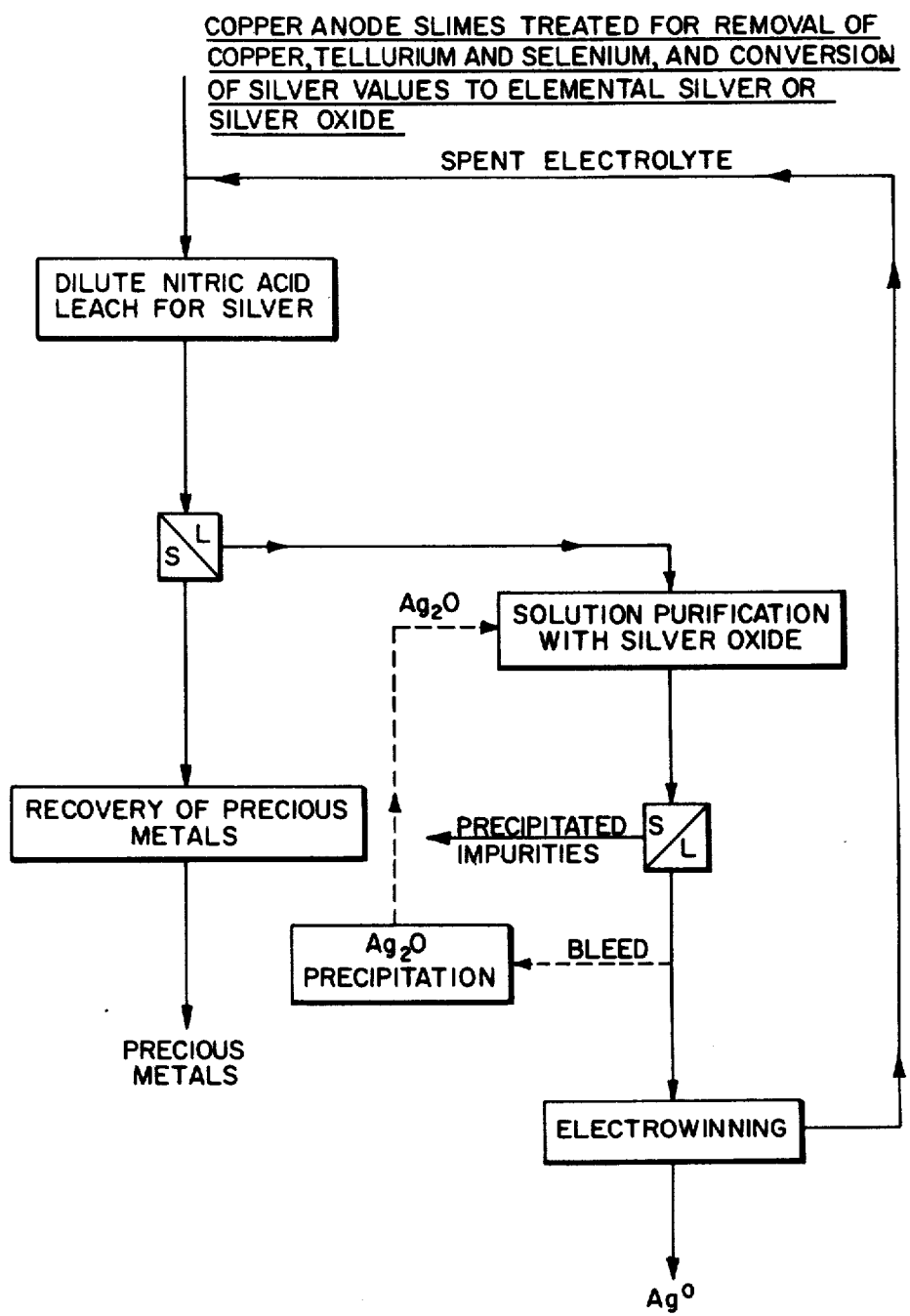

United States Patent [19]

Subramanian et al.

[11] 4,229,270

[45] Oct. 21, 1980

[54] PROCESS FOR THE RECOVERY OF METAL VALUES FROM ANODE SLIMES

[75] Inventors: Kohur N. Subramanian, East Hanover, N.J.; Malcolm C. E. Bell, Oakville, Canada; John A. Thomas, Norval, Canada; Norman C. Nissen, Oakville, Canada

[73] Assignee: The International Nickel Co., Inc., New York, N.Y.

[21] Appl. No.: 26,302

[22] Filed: Apr. 2, 1979

[30] Foreign Application Priority Data

Apr. 12, 1978 [GB] United Kingdom ............... 14345/78
Apr. 12, 1978 [GB] United Kingdom ............... 14346/78
Apr. 12, 1978 [GB] United Kingdom ............... 14347/78
Apr. 12, 1978 [GB] United Kingdom ............... 14348/78

[51] Int. Cl.$^2$ ............................................. C25C 1/00
[52] U.S. Cl. ....................... 204/109; 75/99; 75/112; 75/115; 75/117; 75/119; 75/121

[58] Field of Search ............... 204/109; 75/99, 112, 75/117, 119, 121, 115

[56] References Cited

U.S. PATENT DOCUMENTS

| | | | |
|---|---|---|---|
| 1,941,914 | 1/1934 | Rodrian | 204/109 |
| 2,322,786 | 6/1943 | Betterton et al. | 204/109 |

*Primary Examiner*—R. L. Andrews
*Attorney, Agent, or Firm*—M. W. Leff; R. J. Kenny

[57] ABSTRACT

A process for treating anode slimes containing silver in which the silver is converted to a form soluble in dilute nitric acid, and in which after dissolution in dilute nitric acid, the silver is electrowon from solution. The process can be carried out by a route which is entirely hydrometallurgical. In addition to recovery silver, other values such as Se, Te, Ni and precious metals can be recovered.

18 Claims, 3 Drawing Figures

PROCESS FOR THE RECOVERY OF METAL VALUES FROM ANODE SLIMES

This invention relates to an improved process for the recovery of valuable metals, especially silver, and precious metals from anode slimes. More particularly it relates to a method for extracting silver from copper and nickel anode slimes.

The present invention is described with particular reference to the treatment of anode slimes produced in the electrolytic refining of copper. The electrolytic refining of copper is a process in which a relatively impure copper is made the anode in an electrolytic cell. As the anode corrodes, copper goes into solution and deposits at the cathode and selenium, tellurium and other elements that do not dissolve in the electrolyte sink to the bottom of the electrolytic tanks as slimes. The slimes are treated for their valuable components. While copper anode slimes vary widely in composition, they generally contain significant amounts of copper, selenium, tellurium, lead, silver, gold and some platinum group metals along with nuisance elements such as arsenic, bismuth and antimony. Typical compositions of copper refinery slimes are given on pages 34–35 of SELENIUM edited by Zingaro, R. A. and Cooper, W. C., Van Nostrand Reinhold Company (1974). Approximate ranges of selenium, tellurium, copper, nickel, lead, and precious metals are as follows:

| Approx. Wt. % | Metal Values |
|---|---|
| 2.8 to 80 | Copper |
| <1 to 45 | Nickel |
| 0.6 to 21 | Selenium |
| 0.1 to 13 | Tellerium |
| <1 to 45 | Silver |
| 0.3 to 33 | Lead |
| up to 3 | Gold | minor amounts platinum group metals Gangue components such as $Al_2O_3$, $SiO_2$ and CaO are present in the amount of about 2 to 30%.

In conventional processes such slimes have been treated by a variety of techniques which include a combination of pyro-, hydro-, and vapormetallurgical steps which have resulted in varying degrees of undesirable emissions containing, for example, oxides of selenium, tellurium, sulfur, lead, and other heavy metals. The environmental hazards associated with such fugitive emissions have made it highly desirable to treat slimes for the recovery of valuable metals by a route which reduces the amount of smelting operations, and preferably is totally hydrometallurgical.

Generally, in conventional processes the anode slimes are first sequentially treated for the removal of copper, nickel, selenium and tellurium. One of the particularly difficult problems is the extraction of silver, which may be bound up in the slimes and at intermediate processing stages in compounds with selenium and/or tellurium. One widely used technique for the recovery of silver from slimes is to form a Doré metal, which is a precious metal ingot obtained by smelting the residue previously treated for the removal of copper, nickel, selenium and tellurium. The Doré metal is electrorefined for silver recovery, and the slimes obtained in electrorefining of silver can be further treated for the recovery of gold and platinum group metals. Doré smelting, however, is often regarded as the most expensive and complicated step of slimes treatment processes. Also, it can produce harmful emissions, e.g., of selenium, arsenic, lead and antimony oxides.

Methods have been proposed to avoid or minimize the need for Doré smelting. U.S. Pat. No. 4,002,544, for example, proposes to eliminate Doré smelting by a method which involves treating the copper anode slimes with concentrated sulfuric acid. The silver is not recovered in pure form from the sulfate solution which is formed. It appears that to recover pure silver a smelting operation is carried out under oxidizing conditions to eliminate selenium and tellurium and the silver is cast into anodes for electrorefining. In effect the quantity of material to be smelted and the number of stages are reduced but smelting is not eliminated. This attempt at minimization of the need for Doré smelting can also be found in the rather complex process set forth in U.S. Pat. No. 3,996,046, another process which requires anode slimes to be subjected to a sulfation roast. A part of the silver sulfate made in the sulfation step is leached with a solution of a nitrate salt, preferably $Ca(NO_3)_2$, to form a product suitable for electrowinning. Apparently, in the sulfation roast route which is used to volatilize selenium and to obtain $Ag_2SO_4$ as the primary silver species, sufficient silver goes into solution to require the use of cementation and Doré smelting. It has also been proposed to use a cyanide leach step to complex silver and thereby obtain an electrolyte suitable for electrowinning of silver. Cyanidation is, of course, a treatment which should be avoided, if possible.

It is an object of the present invention to treat anode slimes by an improved method to recover valuable components, particularly silver. It is another object to treat anode slimes to yield commercially pure selenium, tellurium, a precious metal concentrate and silver. It is a further object to treat anode slimes by an overall hydrometallurgical route to recover valuable components from the slimes.

In accordance with one aspect of the present invention anode slimes are treated by a method comprising: converting silver values comprising silver compounds of selenium and/or tellurium to a material containing silver in a form readily leachable in dilute nitric acid, leaching such silver-containing material with dilute nitric acid, and recovering silver from such leach solution by electrowinning. Preferably the silver values are converted to at least one of the species elemental silver, a silver oxide and silver carbonate. Silver sulfide is a less desirable species since it is not as readily converted to the nitrate. If silver sulfide is present, for example, dilute nitric acid is not a satisfactory reagent for conversion of the sulfide to soluble silver nitrate. The reaction will be more complete with more concentrated nitric acid, as explained more fully below.

Generally silver occurs in anode slimes or in an intermediate processing stage as a compound of selenium or tellurium, e.g. as a selenide such as $Ag_2Se$ or CuAgSe. It will be appreciated that depending on various factors such as the composition of the feed, cost, location and availability of reagents and fuel, different processing routes may be taken to remove one or more impurities. The pretreatment route is not critical to the invention so long as the silver species obtained is leachable in dilute nitric acid. Thus, for example, it is possible to produce elemental silver via chloridation followed by ammonia leaching and reduction of the silver values to metallic silver. It is also possible to convert the silver species directly to elemental silver, a silver oxide or carbonate, by a roast stage. Sulfation roasting of anode slimes to volatilize selenium produces silver sulfate, which has a limited solubility in dilute nitric acid and is therefore unsuitable as a pretreatment stage. Roasting of anode slimes or sulfuric acid leached slimes at, e.g. 750° C., to volatilize Se produces a calcine containing silver that is readily soluble in dilute nitric acid. However, essentially all of the palladium (if present) extracts along with silver and this as well as Se volatilization is considered undesirable. Therefore, suitable combinations of the pretreatment stage and the dilute $HNO_3$ leach become important.

In a preferred embodiment of the overall process the entire route including initial stages will be hydrometallurgical Depending on the route taken, the silver species may be converted, e.g. directly from a selenium compound to elemental silver, a silver oxide or silver carbonate. In the hydrometallurgical routes the initial treatments may be in an acid or base medium.

In a preferred embodiment for obtaining a suitable leachable silver species, anode slimes are subjected to a caustic leach under an oxygen partial pressure of about 0.3 to about 1 MPa at a temperature of at least 170° C., preferably about 200° C., to convert silver values to elemental silver and/or a silver oxide. It is preferable not to go above 220° C. since going to higher temperatures will necessitate the use of more expensive equipment. Copper (and/or nickel) and tellurium may be removed from the slimes before the caustic leach, as will be explained more fully below. After the caustic leach the separated leach residue may be treated for removal of copper and tellurium, as will also be explained more fully below. The caustic oxidative pressure leach forms mainly elemental silver and hexavalent selenium.

In another preferred embodiment the anode slimes are treated in an acid oxidative pressure leach followed by caustic addition to obtain a silver species leachable in dilute nitric acid. As a result of this treatment the silver obtained will be present mainly as an oxide and the selenium will be in the basic solution predominantly in the tetravalent form.

The nitric acid leach of the soluble silver species is carried out at an elevated temperature using dilute nitric acid, e.g. up to about 1 N $HNO_3$ and preferably up to $\sim 0.5$ N $HNO_3$. Suitable temperatures for such leaching step may range from above about 70° C. to the boiling point of the solution, preferably the leaching temperature is about 90° to 95° C. To leach the silver at a reasonable rate, the acid concentration during leaching may range, for example, from about 10 gpl (grams per liter) to about 50 gpl, depending on the species of silver present. Elemental silver, for example, leaches readily at relatively low temperatures and acid concentrations. If silver sulfide is present, for efficient rates of dissolution and recovery of the silver, higher temperatures and acid concentrations must be used, e.g. about 90°-95° C. and about 150 gpl. A reason for selecting the mildest conditions consistent with efficient silver dissolution is that if precious metals are present they tend to be dissolved more readily with severer conditions. As will be shown below, however, in a preferred embodiment of the present invention the precious metals and other impurities can be removed from the electrolyte by an improved method.

Advantageously the nitric acid leach is carried out in two stages, preferably in a countercurrent arrangement to extract a preponderant amount of silver from the residue. This permits the use of a relatively high acid strength while curtailing the total amount of acid required. Impurities in the leach liquor, for example, copper, iron, selenium, tellurium, precious metals such as gold and platinum group metals, and heavy metals such as antimony and lead are removed by raising the pH of the solution to at least about 5½ to 7 up to about 9, using a base, depending on the impurities present and the degree of purification desired. For example, palladium precipitates at about pH=5¼. At a pH of about 9 an excessive amount of silver will precipitate.

In accordance with another aspect of the present invention it has been found that silver oxide serves effectively as a base. Several advantages are obtained by using silver oxide to adjust the pH. Impurities in the electrolyte are minimized and, if desired, the purity of the elemental silver produced can be essentially of a spectrographic grade. It will be appreciated, however, that for most purposes such silver purity is not required.

Conveniently, silver oxide may be obtained by treating a bleed of purified pregnant electrolyte or wash water from the cathode silver with caustic.

The purified silver-containing solution is fed to an electrowinning cell provided with insoluble anodes, and silver is recovered therefrom.

The leach residue from the nitric acid leach step described above is treated for further recovery of metal values. For example, the leach residue can be melted for recovery of precious metals. If the level of lead is too high and/or it is desirable to remove lead, it may be selectively dissolved from the residue before further treatment of the residue.

In still another aspect of the invention, the nitric acid leach residue is treated for recovery of precious metals, e.g. gold and platinum group metals. The nitric acid leach residue contains a substantial amount of precious metals present in the anode slimes, and it contains silica, refractory oxides and other unwanted materials. It is, however, essentially free of Se, Te and base metals, which were removed in initial stages of the process. Recovery of precious metals from the residue can be carried out by oxidatively leaching in a chloride medium with $HNO_3$ or $Cl_2$ as the oxidant. With either oxidant essentially all of the precious metals, e.g. Pt, Pd and Au dissolve readily. Gold can be recovered by, for example, selective precipitation with ferrous sulfate or by a solvent extraction technique, e.g. with dibutyl carbitol.

The platinum group metal can be recovered from the gold-free liquor individually by solvent extraction or ion exchange techniques, or by cementation, e.g. with magnesium or iron.

In the overall hydrometallurgical embodiment of the present invention shown above, which includes an oxidative caustic pressure leach step, if appreciable nickel oxide is present it is preferred to remove it by an acid leach step before the caustic pressure leach. For example, the anode slimes may be treated by acid pressure leach as illustrated below with reference to step 1 of FIG. 2 to remove a substantial amount of the nickel and tellurium and a lesser amount of copper. Alternatively, the anode slimes may be treated by a sulfation leach, e.g. in concentrated sulfuric acid with acid concentration greater than 50%, at reaction conditions, e.g. a temperature of at least about 100° or 150° C. and atmospheric pressure, to remove a substantial amount of the copper as well as nickel and tellurium.

An advantage of using the caustic oxidative pressure leach route is that the choice of materials of construction of the equipment are simplified. Further, the separation between selenium and tellurium is particularly well defined. An advantage of using the route involving acid oxidative pressure leach followed by caustic addition is that the selenium is obtained in solution in the tetravalent state, which simplifies its reduction and the copper, nickel and tellurium are obtained in readily leachable form. Both routes have the advantage of being entirely hydrometallurgical and silver recovery is from a dilute nitric acid leach solution by electrowinning.

FIG. 1 is a flow sheet which illustrates an embodiment of the invention in which copper or nickel anode slimes are treated for the recovery of silver. Any conventional steps may be used for obtaining the silver in the species suitable for leaching with dilute nitric acid. In the process shown in FIG. 1, copper anode slimes treated for removal of copper, tellurium and selenium and for the conversion of silver values to silver and/or silver oxide, are then subjected to a dilute nitric acid leach. The silver is recovered by electrowinning. Various recycle routes are shown as alternative procedures.

Figure 2:
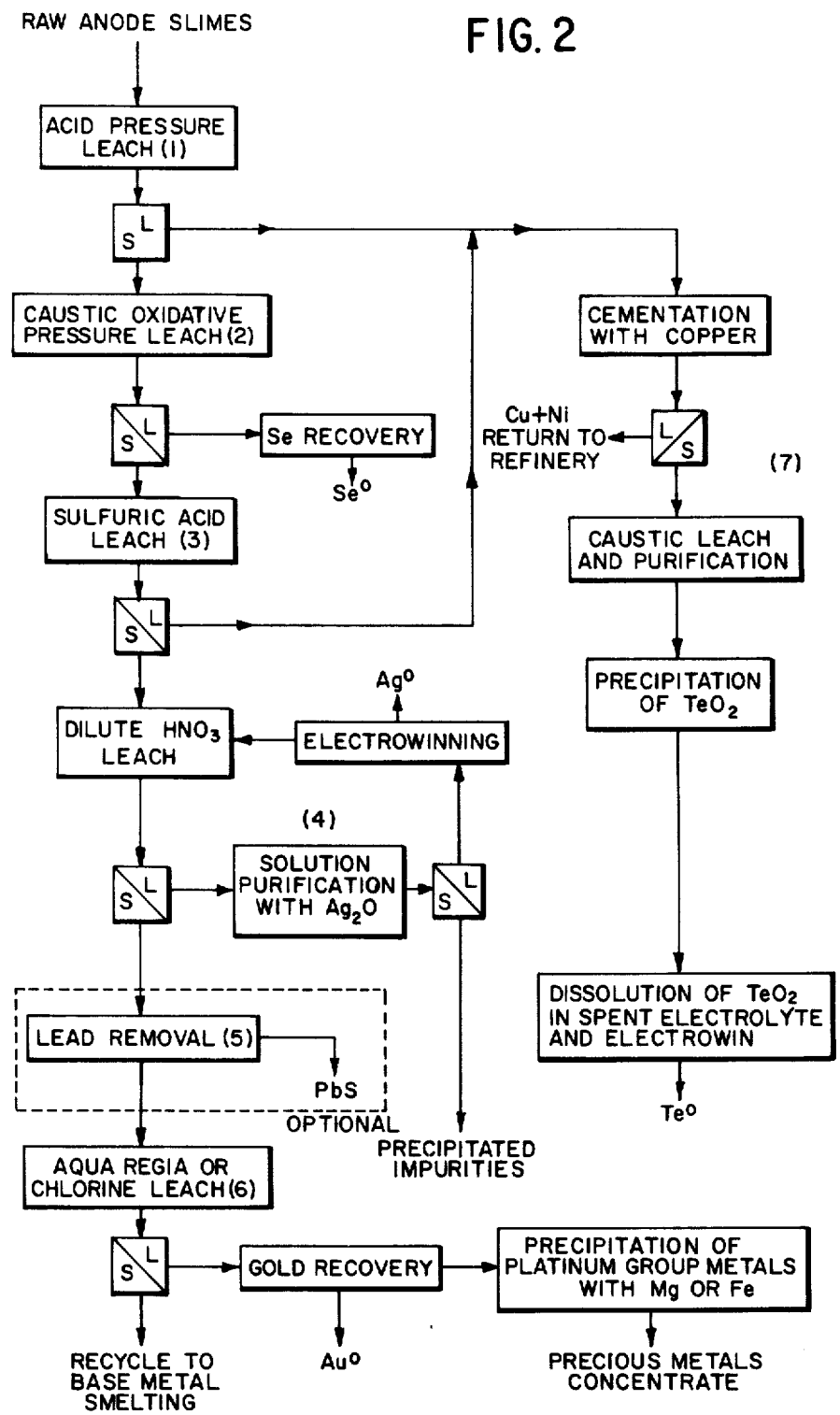
Figure 3:
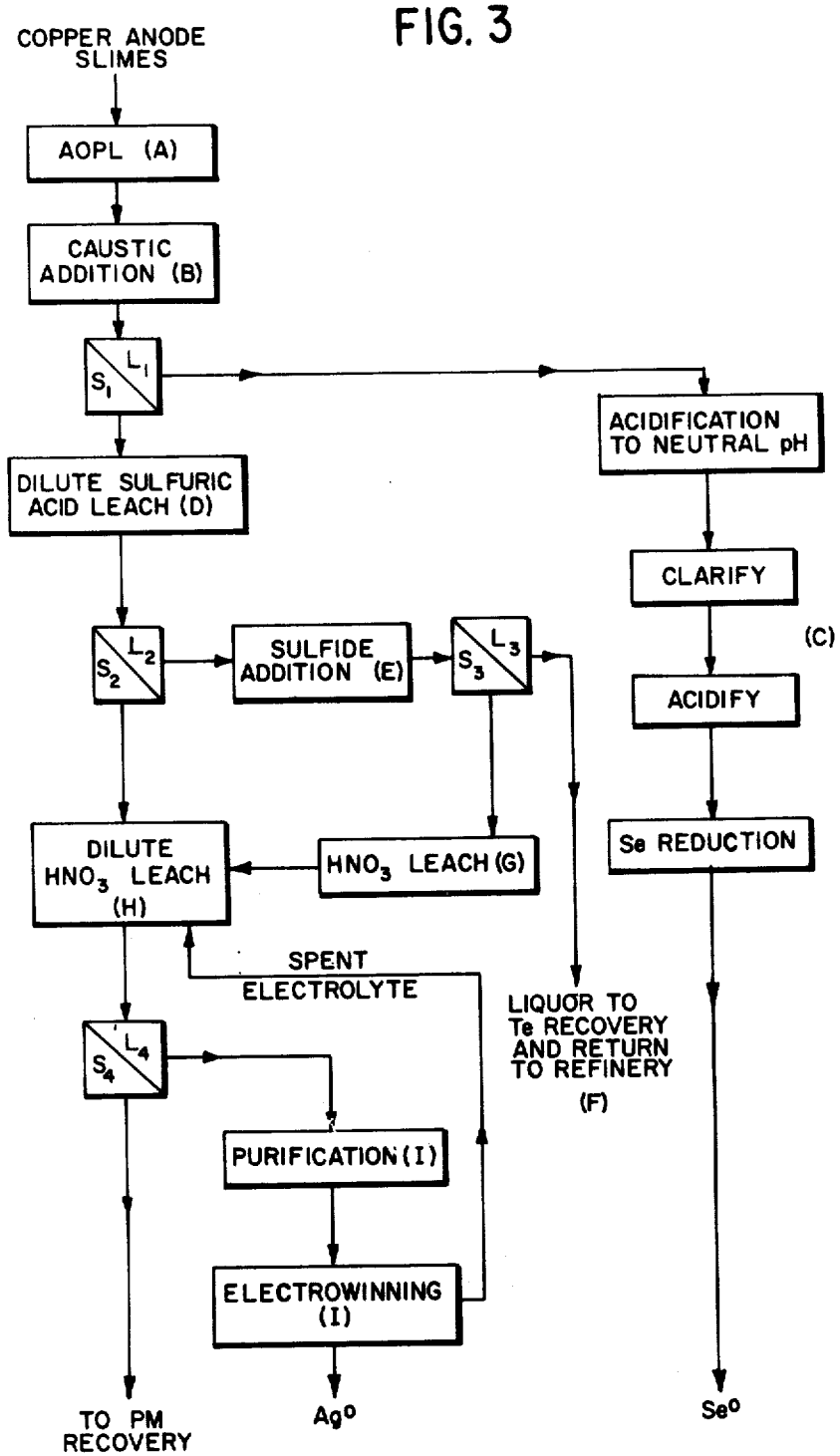

FIGS. 2 and 3 are flow sheets illustrating embodiments of overall hydrometallurgical processes according to the present invention.

Referring first to FIG. 2, the flow sheet shows a sequence of leaching steps is employed exploiting the mineralogy and chemical association of various elements present in the slimes. Anode slimes containing, by weight, approximately 6–16% nickel, 18–30% copper, 12–20% selenium, ~3% tellurium, $\leq$15% silver, $\leq$0.5% gold, $\leq$1% platinum group metals including about 0.4% palladium and 0.2% platinum and 2–8% lead, and can be treated according to the process shown in the flow sheet to produce high purity Se, Te, Ag and Au, a concentrate containing platinum group metals and an innocuous lead precipitate for disposal. Treatment of such slimes is discussed below in the order shown in FIG. 2. In the discussion the term precious metals refers to gold and platinum group metals.

Step 1 (Acid Pressure Leaching)

Nickel is usually present as oxide in anode slimes, and by digesting a slurry of slimes in an aqueous sulfuric acid medium at optimum conditions 99% of the nickel can be extracted. (An alternative sulfation leach for removing most of the copper as well as nickel and tellurium is mentioned above.)

In this step tellurium and nickel are selectively separated from selenium in anode slimes comprising tellurium, nickel and selenium by a method comprising: treating a slurry of anode slimes in an aqueous sulfuric acid solution at a temperature of about 160° C. to about 200° C., preferably 180° C., under a pressure of steam at the temperature.

In general, the sulfuric acid strength, time and temperature for leaching are interrelated and depend also on the species of nickel oxide present. Generally, and consistent with the above interrelationship, sulfuric acid may be used at a concentration of about 10 gpl to about 200 gpl and leaching is continued for about 1 to about 5 hours. The final pH is below about 2 so as to avoid formation of basic nickel sulfate. Conveniently the slimes are treated with spent copper refinery electrolyte, which contains, for example, 150 gpl sulfuric acid.

The following example is illustrative of a method of removing nickel from copper anode slimes in accordance with the present invention.

Copper refinery slimes containing, by weight, approximately 13% nickel, 3% tellurium, 20% copper, 12% selenium, 15% silver, and a small amount of gold and platinum group metals are slurried in an aqueous solution of sulfuric acid under the following conditions:

Temp.: ~range 160°–200° C., preferably 180° C.
Pressure: Natural Steam (V.P.)
% Solids: ~10 to 30, preferably 15 to 20
$H_2SO_4$:Ni Molar Ratio: 2:1 to 4:1, preferably 2.5:1
Time: 1–5 hours, preferably 3 hours Nickel is present in the slimes as oxide and digesting a slurry of anode slimes in refinery electrolyte extracts it according to the equation:

$$NiO + H_2SO_4 \rightarrow NiSO_4 + H_2O$$

A leach under optimum conditions gave the following results:

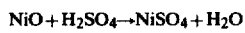

|  | Wt. | Cu | Ni | Te |
|---|---|---|---|---|
| Feed (%) | 100.0 | 19.4 | 13.2 | 2.9 |
| Residue (%) | 73.6 | 21.4 | 0.3 | 1.04 |
| Extraction (%) | 26.4 | 18.8 | 99.1 | 84.1 |

Unexpectedly, about 84% of the Te was extracted, with virtually no selenium or silver, or precious metals in solution. Tellurium can be separated from the liquor, e.g. by cementation, e.g. with copper. Nickel and copper can be recovered from the solution, e.g. by conventional techniques, for example, copper can be recovered by electrowinning and a commercial grade nickel sulfate can be crystallized out of solution. The liquor from the pressure leaching may be fed to the Te recovery train (Step 2). The solids contain principally mixed selenides of Cu, Ag and Se along with precious metals and undesirable impurities such as lead, bismuth, antimony, silica, etc.

Step 2 (Caustic Pressure Leaching and Se Recovery)

The residue from step 1 is leached in a caustic solution (or in an aqueous solution of an alkali metal hydroxide) under oxygen pressure to selectively solubilize selenium at a temperature of at least 170° C., e.g. 200° C. Conditions of the caustic leach optimized to yield maximum Se extraction with virtually no Te extraction and subsequent recovery of high purity selenium from the liquor have been described in detail in a pending Canadian application Ser. No. 279,062, incorporated herein by reference. For example, the leach residue of anode slimes pretreated according to step 1 may be slurried with 0.5 kilogram of caustic soda per kilogram of residue to provide a pulp density of 15% by weight solids, based on the weight of the slimes, and the slurry is subjected to a caustic leach at about 180°–220° C., e.g. approximately 200° C. for about 5 hours under 0.3 to 1 MPa oxygen partial pressure. If the slimes have not been pretreated the amount of caustic would have to be increased.

An important feature of this invention is to realize that the caustic leaching converts most of the copper and silver from a difficult-to-leach selenide form to a readily acid leachable oxide/hydroxide/metallic form with minor amounts of sulfate as well. Hence, the caustic leach residue is subjected to two sequential leaches for copper and silver in step 3 and 4.

Step 3 (Atmospheric Pressure Sulfuric Acid Leaching)

The residue from caustic pressure leaching is leached in dilute sulfuric acid to extract the acid soluble copper and tellurium. The optimum conditions (and preferred ranges) for this leach are:
Temp.: 60° C. (range 40°–95° C.)
pH: 2.0 (1–3)
Solids: 20% (10–30%)
Time: 2 h (1–4 h)

$$Cu(OH)_2 + H_2SO_4 \rightarrow CuSO_4 + 2H_2O$$

$$Na_2TeO_4 + H_2SO_4 \rightarrow NA_2SO_4 + H_2TeO_4$$

Under optimum conditions, the following results were obtained:

|  | Wt. | Cu | Te |
|---|---|---|---|
| Feed (%) | 100 | 22 | 1.5 |
| Residue (%) | 61.4 | 2.4 | 0.9 |
| Extraction (%) | 38.6 | 93.3 | 63.2 |

It can be seen that coincidentally some of the residual tellurium in the feed to step 3 is also solubilized, bringing the overall Te extraction between steps 1 and 3 to 94.1% on the basis of the Te content of anode slimes. In view of their Te content, the liquors from steps 1 and 3 will be combined and processed through step 7 for tellurium recovery.

Step 4 (Dilute Nitric Acid Leaching and Electrowinning of Ag)

The residue from step 3 contains most of the silver in the metallic form. This type of feed is ideally suited for extraction of silver with dilute nitric acid. The liquor can then be purified and silver recovered by electrowinning.

The nitric acid leach is carried out in two counter current stages. The first stage (which uses liquor from the 2nd stage) extracts approximately 50% of the silver while the free acid concentration decreases from ~35 gpl to ~3 gpl. The preferred temperature is about 90° C. In the second stage, the 1st stage leach residue is reacted at 95° C. with spent electrolyte and fresh nitric acid is added to maintain a free acid concentration of 35 gpl. The concentration of free acid is important to ensure high extraction of silver.

The two stages of extractions are given below:

| Stage | Residue Assay (%) | | | Extraction (%) | | |
|---|---|---|---|---|---|---|
|  | Ag | Pd | Pb | Ag | Pd | Pb |
| I | 15.6 | 1.4 | 18.7 | 59.5 | 9.8 | 0.2 |
| II | 3.85 | 1.67 | 23.5 | 33.5 | 8.3 | 0.4 |

The overall extractions were (%) 93 Ag, 18 Pd and 0.6 Pd. The product leach liquor contains undesirable impurities such as copper, lead, selenium, tellurium, palladium, etc. They are removed by raising the pH of the solution to about 6 using a base.

Silver oxide obtained by precipitating weak silver nitrate-containing liquors with caustic appears to be an excellent base. An addition of wet silver oxide cake to adjust to pH about 7 and filtering off the resulting solids yielded the following results:

|  | Ag | Pd | Cu | Pb | Se | Te | (gpl) |
|---|---|---|---|---|---|---|---|
| Leach Solution | 30.5 | 0.2 | 0.14 | 0.14 | 0.01 | 0.37 | |
| Purified Solution | 52 | .001 | 0.001 | 0.002 | <0.005 | <0.003 | |

The purified solution, preferably at a silver nitrate concentration of about 20 or 30 gpl to about 100 gpl, e.g. 60 gpl, (based on the silver content), is fed to an electrowinning cell provided with stainless steel cathodes and insoluble anodes. Silver is electrowon at a temperature of about 40°–50° C., e.g. 45° C., at a current density of typically 100 amp/m$^2$. The silver crystals produced are of very high purity and analyzed <5 ppm each of platinum, palladium, gold, selenium, tellurium, copper and lead.

Step 5 (Lead Removal—Optional)

The leach residue from step 4 contains lead, mostly as lead sulfate, along with silica and precious metal values. If desired, e.g. if smelting this residue would result in some degree of environmental problems, then selective dissolution of lead with acetate may be affected. Treated at:
Temperature: 80° C.
Sodium Acetate: 5 Molar
Time: 2 h
extracted ~80–85% of the lead content of various leach residues containing ~17–25% lead. A leach of a step 4 residue analyzing 17% Pb for 2 hours at 80° C. in a 3 M sodium acetate solution gave the following results:
Pb in Residue: 5.2%
Extraction: 80.7%
To regenerate the acetate the leach liquor is treated with a sulfide, preferably BaS. BaS precipitates lead as well as the sulfate that was introduced into the leachant:

$$Pb(Ac)_2 + BaS + Na_2SO_4 \rightarrow 2NaAc + BaSO_4 + PbS$$

The combined precipitate of BaSO$_4$+PbS is innocuous and can be impounded readily, and the sodium acetate can be recycled. By this treatment, the sodium acetate can be regenerated in one step.

For example, the precipitation of lead and sulfate ions was achieved by addition of solid barium sulfide to an agitated solution maintained at about 60° C. A solution analyzing 11.9 gpl lead was treated with 9.8 gpl of BaS, and after 30 minutes, the solution contained only 0.8 gpl lead, and the residue analyzed:

|  | Pb | Ba |
|---|---|---|
| (%) | 48.8 | 30.4 |

It is desirable that a small amount of lead remain in solution so that no sulfide ions are transferred to the leach. The combined precipitate of BaSO$_4$ and PbS can be treated for recovery of lead (not shown).

Step 6 (Precious Metals Recovery)

The extraction of gold and platinum group metals from the substantially silver-free residue produced in step 4 can be carried out directly on such residue or after lead removal from such residue, e.g. by acetate leaching as shown in step 5.

For example, a residue obtained by a method essentially as described in step 4 containing:

|  | Au | Pt | Pd | Pb |
|---|---|---|---|---|
| Feed (%) | 0.68 | 0.60 | 1.42 | 16.9 | treated in a 2-hour aqua regia leach at ~90°–95° C. analyzed as follows:

|  | Au | Pt | Pd | Pb |
|---|---|---|---|---|
| Extractions (%) | 99.5 | 97.4 | 99.7 | 13 |
| (gpl) | 0.3 | 0.26 | 0.36 | 1 |

The residue from step 5 is essentially free of base metals, Se, Te and contains precious metals with some insoluble material such as silica, refractory, etc. Recovery of precious metals can be ideally carried out from this feed by leaching the same in a chloride medium with $HNO_3$ or $Cl_2$ as the oxidant. In either case, essentially all of the platinum, palladium and gold dissolve readily. For example, in a 2-hour aqua regia leach of a residue obtained essentially as described in step 5 gave the following results:

|  | Au | Pt | Pd | Pb |
|---|---|---|---|---|
| Feed (%) | 0.95 | 0.82 | 2.42 | 4.8 |
| Extractions (%) | 98.8 | 97.5 | 98.9 | 97 |
| gpl | 0.48 | 0.41 | 1.22 | 1.3 |

Note that the lead extraction is believed to be influenced only by solubility in aqua regia. Thus, the concentration of lead extracted is essentially the same from the feed obtained from step 4 or step 5, but subsequent treatment of the silver-containing residue (of step 6) is simplified. (Such residue contains about 15% silver after removal of precious metals, i.e. gold and platinum group metals.) Also lead is collected in a concentrated form for recovery.

Gold can be recovered from this liquor by selective precipitation with $FeSO_4$ or more readily by solvent extraction techniques, e.g. using dibutyl carbitol to extract gold from leach liquors. The loaded organic is directly reduced with oxalic acid to produce high purity gold (99.99%).

The platinum group metals from the gold-free liquor can be recovered individually by solvent extraction or IX (ion exchange) techniques. Alternatively, they could be cemented with a reductant such as magnesium or iron to produce a precious metals concentrate. Concentrates containing up to 70% total platinum group metals can be produced by this step.

The final residue from step 6 contains normally trace amounts of precious metals, but is essentially free of harmful elements such as Se, Te, etc. Hence, this solid residue can be conveniently reverted to a base metal ore smelting operation, without incurring any further loss of values or causing environmental hazard.

Step 7 (Tellurium Recovery)

The combined liquor from steps 1 and 3 forms the principal source of tellurium. Tellurium present as $Te^{4+}$ or $Te^{6+}$ is reduced with metallic copper to form solid $Cu_2Te$, which is separated. The liquor is returned to the copper refinery, while the solids become the feed to tellurium recovery circuit.

Copper telluride (frequently referred to as cementation solids) contained in the solid is leached in a caustic solution under aerated conditions to selectively dissolve tellurium, according to the reaction:

$$Cu_2Te + 2NaOH + 5/2O_2 \rightarrow 2Cu(OH)_2 + Na_2TeO_3$$

The leaching conditions are:
Temperature: ~(60°–95° C.), preferably 85° C.
Solids: ~(10–30%), preferably 15%
pH: ~(11–13), preferably 11.5

A sample of cementation solids analyzing 20.5% Te was leached at pH 11.5 and 85° C. for 2 hours. The extraction was 80%. The leach slurry is acidified to pH ~10 at 85° C. to selectively reprecipitate impurities such as Pb, Cu, $SiO_2$, etc., and the solids separated from a purified Te liquor. The resulting solids can be recycled to step 1.

Purified sodium tellurite liquor from above is acidified at 80° C. to pH 6.0 to precipitate essentially all of the tellurium as $TeO_2$, leaving a barren liquor containing ~0.04 gpl Te. The $TeO_2$ precipitate is recovered, redissolved in spent electrolyte containing 75 gpl NaOH and 60 gpl Te to form pregnant electrolyte. Tellurium is electrowon from such an electrolyte at 40° C., 65 amp/$m^2$ current density, using stainless steel electrodes. A washed deposit, having a coherent structure and metallic appearance analyzed (ppm) 50 Cu, 9 Pb, 19 Fe, <150 $SiO_2$, 400 Na and 99.9% Te (by difference).

The above steps 1 through to 7 demonstrate that a novel totally hydrometallurgical scheme can be employed.

(a) to remove Cu and Ni from anode slimes and recycle them to the copper refinery
(b) to recover high purity Se and Te
(c) to recover very high purity silver
(d) to produce a concentrate containing platinum group metals
(e) to reject lead in an innocuous form FIG. 3 is a flow sheet illustrating another embodiment of an overall process in accordance with the present invention. As indicated above with respect to the embodiment of FIG. 2, a sequence of leaching steps is employed which is tailored to the particular composition of the slimes. Referring to FIG. 3 for the sequence of steps, anode slimes having the same general composition as shown above for the embodiment of FIG. 2 may be processed as follows:

Step A (Acid Oxidative Pressure Leach—AOPL)

The purpose of this step is to obtain high levels of selenium, copper, nickel and tellurium extractions.

The slimes are slurried in refinery electrolyte or, preferably for reducing the amount of copper and nickel passing through the system, are first washed and then slurried in sulfuric acid solution. The optimum conditions are:

Temperature ~200° C.—minimum 180° C.
Solid Concentration ~200 gpl—highest practical level if using refinery electrolyte
Initial Acid Concentration ~180 gpl—reduction of initial acid concentration to 50 gpl lowers Se and Ni extraction
Oxygen Overpressure—0.3 MPa
Time ~3 Hrs (Batch Leach)—minimum time required for maximizing Se extraction With respect to the temperature, nothing is gained technically with a higher temperature than 200° C. and costs are higher. Below ~180° C. Se extraction falls off. The solids concentration should be the highest practical level depending on the leaching medium and composition of the slimes. If, for example, just $H_2SO_4$ is the leaching medium the solids concentration can be increased to 250 gpl. A practical working level for oxygen partial pressure is about 0.3 MPa to about 0.7 MPa (~45-100 psi). For an efficient process the acid oxidative pressure leach step is carried out for the minimum time required to maximize Se extraction. Under the conditions shown for the particular feed, this takes, typically, about 3 hours.

The acid oxidative pressure leach extracts Cu, Ni, Se, Te and to a lesser extent Ag.

Step B (Caustic Treatment)

The purpose of this step is to separate Se from other metal values. To achieve this the leach discharge from Step A is treated with an alkali metal hydroxide (carbonate is not satisfactory), e.g. NaOH, to precipitate metal values such as Cu, Ni, Ag and Te. Sufficient NaOH is added to provide at least 20 gpl in solution. The caustic treatment is carried out at a temperature in the range of about 90° C. up to about the boiling point of the solution for a period of time to maximize the dissolution of selenium and precipitation of other metal values. Typically this will take at least ½ hour.

After the caustic treatment a solid/liquid separation is carried out, the solid phase being preferred to as $S_1$ and the liquid phase $L_1$.

Substantially all the Se, e.g. >90%, in solution ($L_1$) is in the tetravalent state and may be recovered in a commercially pure form by gassing with $SO_2$, no catalyst being required. Smalls amounts of impurities may first be removed as shown below in Step C.

A major advantage of the combination of Step A and Step B is that it produces selenium in solution in the tetravalent form from which commercially pure selenium can be recovered without the need for a catalyst.

Step C (Treatment of Liquid Phase $L_1$ for Se Recovery)

Liquid phase $L_1$ contains in solution substantially only Se with minor amounts of impurities. Impurities, particularly $Te^{4+}$, may be removed from the solution prior to Se reduction by acidification to neutral pH (~6–8) and clarificaton. It may also be desirable to add small amounts of soluble sulfide (not shown), e.g. NaSH or $Na_2S$, if significant extraction of any of the platinum group metals (i.e. Pt, Pd, Ru, Rh, Os and Ir) has occurred. Generally such sulfide addition would amount to about 0.1 to 0.2 gpl. Clarification would follow such treatment. Thereafter $Se^0$ can be precipitated from solution by reduction with $SO_2$.

Step D (Acid Leach of Solid Phase $S_1$ with Dilute $H_2SO_4$)

$S_1$, the solid phase separated from the caustic treatment of Step B, is essentially a mixed precipitate of hydroxides and unleached slimes. This solid phase is leached with dilute $H_2SO_4$ at a controlled pH of 2 (range=about 1.5-2.5) and at 60° C. (range=about 50° to 80° C.) for a sufficient time to dissolve Cu, Ni and Te, e.g. for about 1 hour or more.

A liquid/solid separation is carried out to provide solid phase $S_2$ and liquid phase $L_2$. Most of the silver reports to $S_2$, but some Ag is dissolved in the liquid phase $L_2$.

Step E (Sulfide Treatment of Liquid Phase $L_2$)

Liquid phase $L_2$ contains Cu, Ni, Te and some Ag. This solution is first treated for Ag recovery by addition of a soluble sulfide, e.g. $H_2S$, $Na_2S$ or NaSH, in an amount slightly in excess of the stoichiometric requirement (~110–120%) to precipitate all silver present as silver sulfide. This treatment is very specific for Ag precipitation.

Another liquid/solid separation is carried out (to form $L_3$ and $S_3$).

Step F (Purification and Recycle of Liquid Phase $L_3$)

The liquid phase $L_3$ contains most of the Cu and Ni which has been extracted from the slimes. It may be purified in a conventional manner for Te removal, e.g. by cementation with copper prior to recycle to the refinery. Tellurium may be recovered from the cementation product by the method disclosed in step 7 of FIG. 2.

Step G (Nitric Acid Leach of Solid Phase $S_3$)

The silver sulfide containing solid phase $S_3$ is treated with $HNO_3$ to dissolve silver, and the resultant $AgNO_3$ solution can be used in the treatment of solid phase $S_2$ (Step H) or it can be combined with the product of Step H.

To dissolve silver sulfide, nitric acid is used in an amount to provide at least 150 gpl $HNO_3$ in solution, e.g. 200 gpl, and the leaching medium is maintained at about 95° C. (up to the boiling point of the solution) for the period of time needed to dissolve the silver, typically ½ hour. Small amounts of sulfate which may form, may be precipitated, e.g. with barium nitrate, and removed.

As indicated previously, and as shown below in Step H, milder conditions may be used to dissolve silver oxide than silver sulfide. Accordingly, the leach medium from the silver sulfide treatment may be used as an acid source for the more dilute leach of Step H.

Step H (Acid Leach of Solid Phase $S_2$ with Dilute $HNO_3$)

The sulfuric acid leach residue is leached in dilute nitric acid, maintaining the $HNO_3$ concentration at 10–50 gpl, e.g. 25 gpl at about 90° C. to the boiling point of the solution, e.g. 95° C., for sufficient time to get maximum extraction of silver, e.g. at least about 3 hours. A two-stage counter-current leach as shown in step 4 of FIG. 2 could be used to advantage.

The $NHO_3$ treated material containing $AgNO_3$ in solution is separated into liquid and solid phases, $L_4$ and $S_4$, respectively.

Step I (Purification and Electrowinning)

The leach solution $L_4$ of Step H (or the combined solutions of Steps G and H) are treated, preferably with $Ag_2O$, to hydrolyzed and precipitate impurities such as Pd, Cu and Pb. Electrowinning is then used to recover Ag from the silver nitrate solution under the conditions shown above.

The spent electrolyte may be recycled for leaching operations.

The residue $S_4$ may be treated for precious metal recovery, e.g. by smelting or leaching in aqua regia or $HCl/Cl_2$.

The embodiment of FIG. 3 is a further example of a totally hydrometallurgical system that may be employed in accordance with the present invention. The embodiment of FIG. 3 is illustrated in the experiments reported below.

1. Acid Oxidative Pressure Leach (Step A)

An acid oxidative leach experiment on anode slimes in refinery electrolyte at 0.35 MPa $O_2$ partial pressure shows the effect of various conditions on extraction of Cu, Ni, Se, Te and Ag from the slimes. The conditions and % extraction for twelve leaches carried out in a 2 liter autoclave are shown in Table 1.

TABLE 1
RESULTS OF ACID OXIDATIVE LEACH TESTS ON ANODE SLIMES IN REFINERY ELECTROLYTE
Electrolyte contained 180 gpl $H_2SO_4$, 35 gpl Cu, 20 gpl Ni

| Solids gpl Slurry | Time (hrs) | Temp. °C. | Cu | Ni | Se* | Te | Ag |
|---|---|---|---|---|---|---|---|
| 150 | 2.5 | 160 | 99 | 91 | 59 | 96 | 0.05 |
| 250 | 2.5 | 160 | 98 | 50 | 66 | 95 | 0.1 |
| 150 | 5.0 | 160 | 99 | 98 | 74 | 95 | 16.3 |
| 250 | 5.0 | 160 | 98 | 60 | 72 | 84 | 4.7 |
| 150 | 2.5 | 200 | 99 | 99 | 94 | 93 | 79.9 |
| 250 | 2.5 | 200 | 98 | 86 | 75 | 71 | 17.7 |
| 150 | 5.0 | 200 | 99 | 99 | 97 | 92 | 83.7 |
| 250 | 5.0 | 200 | 96 | 92 | 82 | 67 | 16.3 |
| 150 | 5 | 180 | 99 | 99 | 84 | 87 | 53 |
| 200 | 5 | 200 | 96 | 99 | 96 | 75 | 56 |
| 250 | 5 | 180 | 99 | 96 | 73 | 80 | ** |
| 200 | 5 | 200 | 94 | 99 | 98 | 84 | ** |
| Analysis of feed (%) (washed, dried) | | | 27.1 | 6.38 | 19.0 | 2.67 | 16.0 |

*Se extraction includes Se that was present in the leach residue as a dilute HCl-soluble form ($Ag_2SeO_3$).
**Unknown as slurries cooled and Ag precipitated as the selenite.

For an efficient process Se extraction must be high, e.g. >90%. Consequently, from Table 1 it is apparent that 200° C. is necessary, and that 250 gpl solids is too high for efficient leaching. Also, in the batch autoclave used, a 2½ hour leach time did not give as high an extraction as 5 hours. It can also be seen that >50% of the Ag was extracted with high Se extractions were obtained. Cu and Ni extractions were also high under these conditions.

A larger scale test (16 liter) was carried out, and the kinetics of the leach were obtained. The results are presented in Table 2, and it can be seen that a 3 hour leach time gives a 95.8% Se extraction, and 2 hours more of leaching raises this by 0.7%.

TABLE 2
KINETICS OF BATCH LEACHING
150 gpl Solids in Refinery Electrolyte
200° C., .35 MPa $O_2$ Partial Pressure

| Time | Extraction (%) | | | |
|---|---|---|---|---|
| | Cu | Ni | Te | Se |
| 30 mins | 99.7 | 99.2 | 91 | 67 |
| 1 hr | 99.7 | 99.8 | 91 | 81.5 |
| 2 hrs | 99.7 | 99.8 | 91 | 94.5 |
| 3 hrs | 99.7 | 99.8 | 91 | 95.8 |
| 4 hrs | 99.7 | 99.8 | 91 | 96.4 |
| 5 hrs | 99.7 | 99.8 | 91 | 96.5 |

2. Caustic Treatment (Step B)

A leach slurry with the following analysis (in glp) was treated with caustic:

| Cu | Ni | Se | Te | Ag |
|---|---|---|---|---|
| 80 | 37 | 18 | 3.7 | 16 |

The pH was taken to 10.5, where little free caustic was present, and varying amounts of caustic were added. The initial caustic addition was done at 95° C. in a continuous manner with a 15 minute retention time, while the second batch addition was aged for 1 hour at 95° C.

| Caustic Addition (gpl) | Se in Solution (%) |
|---|---|
| 0 | 65 |
| 10 | 93.7 |
| 20 | 96 |
| 30 | 96 |

3. Selenium Production (Step C)

A liquor produced by caustic treatment of AOPL discharge was neutralized to pH 7, clarified, acidified to 100 gpl $H_2SO_4$ and gassed with $SO_2$ at 30° C. for 1½ hour. Selenium powder was added as seed (~10% by weight of the final product) and the temperature raised to 70° C., thus transforming the red selenium to the grey form. The product had the following analysis (ppm):

| Cu | Te | Pb | As | Pt | Pd |
|---|---|---|---|---|---|
| 60 | 60 | 4 | 30 | 20 | 70 |

Possible reduction in the Pt and Pd levels was tested by adding NaSH to the pH 7 liquor, and the following results were obtained:

| NaSH Added (gpl) | Solution Analysis (mg/l) | |
|---|---|---|
| | Pt | Pd |
| .0 | 1.1 | 1.5 |
| .05 | 1.7 | 2.4 |
| .1 | .1 | .1 |
| .2 | .15 | .1 |

4. Sulfuric Acid Leaching of AOPL Residue (Step D)

An AOPL discharge, treated with NaOH, filtered and washed had the following analysis (%):

| Cu | Ni | Se | Te | Ag |
|---|---|---|---|---|
| 33.1 | 16.3 | .8 | 1.6 | 7.5 |

A leach was carried out for 1 hour at 60° C. with a controlled pH of 2. The solids concentration was such that a final copper concentration of 60 gpl was obtained. The extractions were (%):

| Cu | Ni | Se | Te | Ag |
|---|---|---|---|---|
| 99.9 | 99.7 | 42.9 | 95.5 | 48.9 |

After filtration the solution was treated with NaSH equivalent to 110% of the stoichiometric amount required to form $Ag_2S$. The silver concentration was reduced from 5.2 gpl to 4 mg/l.

5. Recovery of Silver by Nitric Acid Leaching (Steps G & H)

A residue $S_2$ from sulfuric acid leaching was leached at two nitric acid levels, 5 and 50 gpl for 3 hours at 95° C., and the following extractions were obtained:

| $HNO_3$ | Ag | Pd | Cu | Ni | Se | Te |
|---|---|---|---|---|---|---|
| 5 gpl | 90.6 | 0.7 | 94 | 57 | <.3 | 25 |
| 50 gpl | 99 | 36 | — | — | — | — |

The highest impurity level was Cu, at 1.4 gpl, with a Ag concentration of 26 gpl, but no problem is envisaged purifying this solution using $Ag_2O$ as base.

The $Ag_2S$-containing residue $S_3$ was leached at 75 gpl $HNO_3$ at 95° C. for 2 hours, but only 56% Ag extraction was obtained. Using 150 gpl $HNO_3$, the silver was substantially all dissolved (99%). A residue amounting to 1–3% of the feed solids remained after leaching.

Electrowinning of Ag from the $AgNO_3$ solutions produced can be carried out as shown above, e.g. a purified solution having a silver nitrate concentration of about 20 gpl to about 100 gpl Ag (e.g. 60 gpl) can be used as the electrolyte in a cell operated at an anode current density of typically 100 amp/$m^2$ at moderate temperatures, e.g. about 40°–50° C. using insoluble anodes.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What we claim is:

1. In a process for treating anode slimes which contain silver values and at least one of the metal values selenium and tellurium, and which may contain copper, nickel, precious metals and gold values, in which silver is recovered by electrowinning from an aqueous silver nitrate-containing solution, the improvement comprising converting silver values comprising silver compounds of selenium and/or tellurium to a material containing silver in a form readily leachable in dilute nitric acid, leaching such silver-containing material with dilute nitric acid, and recovering silver from such leach solution by electrowinning.

2. The process of claim 1, wherein the raw slimes are treated substantially only by a hydrometallurgical route to extract selenium and/or tellurium and silver from the anode slimes.

3. The process of claim 2, wherein copper, (±nickel), selenium and tellurium are present in the slimes and wherein the process comprises:
   a. subjecting the anode slimes to a caustic oxidative leach at a temperature of at least about 170° C. up to about 220° C. and an $O_2$ partial pressure of about 0.3 to about 1 MPa,
   b. separating the caustic leach solution from the residue,
   c. treating the caustic leach residue with dilute nitric acid at a temperature of about 70° C. to the boiling point of the solution to dissolve silver values as silver nitrate,
   d. separating the resultant silver nitrate containing leach solution from the dilute nitric acid leach residue, and
   e. electrowinning silver from the silver nitrate-containing solution; and wherein copper derived from the anode slimes is removed by an acid treatment before and/or after the caustic oxidative leach step.

4. The process of claim 3, wherein the slimes also contain nickel and prior to the caustic oxidative leach the slimes are subjected to an acid pressure leach in sulfuric acid at a temperature in the range of about 160° to about 200° C. at a $H_2SO_4$:Ni molar ratio of about 2.5:1 to about 4:1 for a period of time required to maximize extraction of nickel and tellurium from the slimes, said acid treatment also extracting copper from the slimes, the acid pressure leach solution is separated from the acid pressure residue, and the acid pressure leach residue is then subjected to the caustic oxidative leach.

5. The process of claim 3, wherein the slimes also contain nickel and prior to the caustic oxidative leach the slimes are subjected to a sulfation leach in concentrated sulfuric acid, the acid strength being greater than about 55%, and the temperature being greater than 100° C. to the boiling point of the solution, and atmospheric pressure said sulfation treatment extracting nickel, tellurium and copper from the slimes, the sulfation leach solution is separated from the sulfation leach residue, and the sulfation leach residue is then subjected to the caustic oxidative leach.

6. The process of claim 3, wherein prior to treating the caustic leach residue with dilute nitric acid the caustic leach residue is leached with sulfuric acid at atmospheric pressure and at a temperature range of about 40°–95° C. to extract copper and tellurium, the resultant sulfuric acid leach residue is separated from the solution, and the dilute nitric acid leach is carried out on said separated sulfuric acid residue.

7. The process of claim 3, wherein separated silver-nitrate-containing leach solution is raised to a pH of between 5½ to about 9 with a base to precipitate impurities.

8. The process of claim 7, wherein the base is a silver oxide.

9. The process of claim 3, wherein the separated dilute nitric acid leach residue contains lead and precious metals and said dilute nitric acid leach residue is treated for the removal of lead by a method comprising leaching said residue in an aqueous solution of a water soluble acetate to extract lead and the acetate treated residue is treated for recovery of precious metals.

10. The process of claim 9, wherein the water soluble acetate is sodium acetate and the sodium acetate is regenerated with barium sulfide.

11. The process of claim 2, wherein copper, nickel and tellurium are present in the slimes, comprising:
   a. extracting copper, nickel and tellurium from the slimes by an acid leach treatment selected from:
      i. subjecting the slimes to an acid pressure leach in sulfuric acid at a temperature in the range of about 160° C. to about 200° C. at $H_2SO_4$:Ni molar ratio of about 2.5:1 to about 4:1, to extract nickel and tellurium from the slimes, or
      ii. subjecting the slimes to a sulfation leach in concentrated sulfuric acid, the sulfuric acid concentration being greater than about 55% at atmospheric pressure and an elevated temperature,
   b. separating the acid pressure leach solution and residue, c. subjecting the separated acid leach residue to a caustic pressure leach at a temperature of at least about 170° C. up to about 220° C. and an $O_2$ partial pressure of about 0.3 to about 1 MPa, d. separating the caustic pressure leach solution and residue, e. treating the separated caustic pressure leach residue to a dilute sulfuric acid leach at a temperature of about 40° C. to about 95° C. at a pH of about 1-3 to extract copper and tellurium, f. separating the dilute sulfuric acid leach solution and residue, g. subjecting the separated residue from the dilute sulfuric acid leach of step c to a dilute nitric acid leach at a temperature of about 70° C. to the boiling point of the solution to dissolve silver values as silver nitrate, h. separating the resultant silver nitrate-containing leach solution, from the dilute nitric acid leach residue, i. treating the separated silver nitrate-containing leach solution with a base to raise the pH to about $5\frac{1}{2}$ to about 9 to precipitate impurities, and clarifying the solution, and j. treating the clarified silver nitrate-containing leach solution to electrowin silver.

12. The process according to claim 11, wherein the separated dilute nitric acid leach residue contains lead and precious metals and wherein said dilute nitric acid leach residue is leached with sodium acetate to remove lead, and the separated residue is treated for the recovery of precious metals.

13. The process of claim 11, wherein the separated dilute sulfuric acid leach solution which contains copper and/or tellurium is cycled back to the acid pressure leach solution.

14. The process of claim 2, wherein the raw refinery slimes contain copper, (±nickel), selenium and tellurium and the method comprises:

a. subjecting the raw slimes to an acid oxidative pressure leach in a solution comprising sulfuric acid at a temperature of at least 180° C. and an oxygen pressure of about 0.3 MPa to about 0.7 MPa, b. subjecting the discharge from the acid oxidative pressure leach to a caustic treatment with an alkali metal hydroxide at a temperature in the range of about 90° C. to the boiling point of solution to maximize the dissolution of selenium and to precipitate copper, (±nickel), and separating the liquid and solid phases, c. treating the separated liquid phase from the caustic leach for Se recovery, d. treating the separated solid phase from the caustic leach with dilute sulfuric acid at a controlled pH of about 1.2 to about 2.5 and a temperature of about 50° to 80° C. to optimize extraction of Cu, Ni and Te, and separating the resultant liquid and solid phases, e. treating the separated liquid phase of the dilute sulfuric acid leach with a soluble sulfide to precipitate silver sulfide, and separating the resultant solid and liquid phases, f. treating the separated solid phase, derived from the treatment with a soluble sulfide, with nitric acid in an amount to provide at least 150 gpl $HNO_3$ in solution at an elevated temperature to dissolve silver as $AgNO_3$, g. treating the separated sulfuric acid leach residue with dilute $HNO_3$ at a concentration of about 10–50 gpl and at 90° C. to the boiling point of the solution to extract silver as $AgNO_3$ and separating the resultant leach residue and solution, and h. electrowinning Ag from the $AgNO_3$-containing leach solution.

15. The process of claim 14, wherein the separated silver nitrate-containing solution obtained by treating the silver sulfide containing residue with nitric acid is used in the dilute nitric acid leaching medium for the separated solid residue of the dilute sulfuric acid leach.

16. The process of claim 1, wherein the silver values in the slimes are converted to at least one of the species selected from the group elemental silver, a silver oxide, and silver carbonate.

17. The process of claim 16, wherein the dilute nitric acid leach is carried out in a medium containing from about 10 gpl to about 50 gpl $HNO_3$ at a temperature of from above about 70° C. to the boiling point of the solution.

18. The process of claim 1, wherein the dilute nitric acid leach residue is treated for recovery of precious metals by a method comprising oxidative leaching with $Cl_2$ in a chloride medium, and the precious metals are recovered from solution.

* * * * *